US010207411B2

(12) United States Patent
Michalakis (10) Patent No.: US 10,207,411 B2
(45) Date of Patent: Feb. 19, 2019

(54) SYSTEMS AND METHODS FOR SERVICING A VEHICLE

(71) Applicant: Toyota Research Institute, Inc., Los Altos, CA (US)

(72) Inventor: Nikolaos Michalakis, Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 190 days.

(21) Appl. No.: 15/422,016

(22) Filed: Feb. 1, 2017

(65) Prior Publication Data
US 2018/0215043 A1    Aug. 2, 2018

(51) Int. Cl.
*B25J 9/16* (2006.01)
*B60S 5/02* (2006.01)
*B60S 5/06* (2006.01)
*B60S 5/04* (2006.01)
*B60S 3/04* (2006.01)
(Continued)

(52) U.S. Cl.
CPC ............ *B25J 9/1697* (2013.01); *B25J 5/007* (2013.01); *B25J 11/008* (2013.01); *B25J 11/0085* (2013.01); *B25J 19/021* (2013.01); *B60L 11/1816* (2013.01); *B60S 3/04* (2013.01); *B60S 5/02* (2013.01); *B60S 5/04* (2013.01); *B60S 5/06* (2013.01); *G05D 1/0234* (2013.01); *G06T 7/70* (2017.01); *H04N 5/332* (2013.01); *G05B 2219/45084* (2013.01); *G05D 2201/0203* (2013.01); *G06T 2207/30204* (2013.01); *Y10S 901/01* (2013.01)

(58) Field of Classification Search
CPC .......... B60L 11/1816; B60S 5/02; B60S 3/04; B60S 5/04; B67D 7/0403; B67D 7/0401; B67D 2007/0461; B67D 2007/0471; B67D 2007/0474; G05B 2219/40584; G05D 1/0234; G05D 2201/0203; G08G 1/017
See application file for complete search history.

(56) References Cited

U.S. PATENT DOCUMENTS 5,671,786 A * 9/1997 Corfitsen ............... B25J 9/1679
141/231
5,682,030 A   10/1997 Kubon
(Continued)

FOREIGN PATENT DOCUMENTS

CN      1329712 C      12/2004
JP      H10255019 A     9/1998
(Continued)

*Primary Examiner* — Dale Moyer
(74) *Attorney, Agent, or Firm* — Christopher G. Darrow; Darrow Mustafa PC (57) ABSTRACT

A service robot can detect one or more makers positioned on relative surfaces of a vehicle. Each marker can include data corresponding to its location on the vehicle. The service robot can determine the location of the markers based on the data. The service robot can also determine the location of a service area proximate to the markers. The service robot can receive data generated by the vehicle corresponding to at least one maintenance condition for the vehicle related to the service area. The service robot can select a service to perform on the vehicle based on the at least one maintenance condition. The service robot can be controlled so as to perform the selected service on the vehicle.

20 Claims, 7 Drawing Sheets

(51) Int. Cl.
    *B60L 11/18*     (2006.01)
    *B25J 11/00*     (2006.01)
    *G05D 1/02*     (2006.01)
    *G06T 7/70*     (2017.01)
    *H04N 5/33*     (2006.01)
    *B25J 5/00*     (2006.01)
    *B25J 19/02*     (2006.01)

(56) References Cited

U.S. PATENT DOCUMENTS

| | | |
|---|---|---|
| 6,237,647 B1 * | 5/2001 | Pong .................... B67D 7/0401 141/231 |
| 7,027,612 B2 | 4/2006 | Patterson et al. |
| 8,180,561 B2 | 5/2012 | Osanai |
| 8,461,804 B1 | 6/2013 | Capizzo |
| 9,069,653 B2 | 6/2015 | Be et al. |
| 9,146,898 B2 | 9/2015 | Ihlenburg et al. |
| 9,169,114 B2 | 10/2015 | Butler, Jr. |
| 2014/0022068 A1 | 1/2014 | Usami |
| 2014/0305545 A1 * | 10/2014 | Butler, Jr. ............ B67D 7/0401 141/94 |
| 2016/0217581 A1 | 7/2016 | Su et al. |
| 2016/0327404 A1 | 11/2016 | Israelsson et al. |
| 2018/0001777 A1 * | 1/2018 | Kilic .................. B60L 11/1816 |

FOREIGN PATENT DOCUMENTS

| | | |
|---|---|---|
| WO | 2008007076 A1 | 1/2008 |
| WO | 2015172770 A1 | 11/2015 |

\* cited by examiner

SYSTEMS AND METHODS FOR SERVICING A VEHICLE

TECHNICAL FIELD

The subject matter described herein relates in general to servicing a vehicle and, more particularly, to service robots for automatically servicing a vehicle.

BACKGROUND

Most vehicles need some form of servicing to be maintained in an operable condition. Examples of servicing that are typically performed on vehicles include refueling, charging of batteries, adding air to various tires, etc. These services are typically performed on the vehicle by the owner and/or a mechanic. When performed by someone other than the owner (e.g., the mechanic), this can be time consuming, as the owner must identify the services to be performed, or the mechanic must inspect the vehicle to identify necessary and/or desirable services. Further, when performed by the owner, the owner/driver may need to exit their vehicle, at times in adverse weather conditions, to perform these services.

SUMMARY

One embodiment includes a robotic service station system. The system can include a service robot for performing one or more services on the vehicle. The system can also include one or more processors communicably coupled to a camera and to the service robot. The system can also include a memory communicably coupled to the one or more processors. The memory can store a marker location determination module including instructions that, when executed by the one or more processors, cause the one or more processors to detect, using an image captured by the camera, a marker positioned on a surface of the vehicle. The marker location determination module can also include instructions to determine a location of the marker on the vehicle based on data encoded the marker. The marker location determination module can also include instructions to determine, based on the location of the marker, a service area located proximate to the marker. The memory can also store a maintenance condition determination module including instructions that, when executed by the one or more processors, cause the one or more processors to determine, based on data generated by the vehicle and associated with the detected marker, a maintenance condition related to the service area of the vehicle located proximate the marker. The memory can also store a robotic control module including instructions that, when executed by the one or more processors, cause the one or more processors to control one or more components of the service robot to perform a service at the service area, the service selected from the one or more services performable by the service robot based on the maintenance condition.

Another embodiment includes a service robot. The service robot can include a camera positioned to capture an image of a vehicle located proximate to the service robot. The service robot can also include a robotic arm that is actuatable to perform one or more services on the vehicle. The service robot can also include one or more processors communicably coupled to the camera and the robotic arm. The service robot can also include a memory communicably coupled to the one or more processors. The memory can store directions for each of the one or more services performable by the service robot. The memory can also store a marker location determination module including instructions that, when executed by the one or more processors, cause the one or more processors to detect, using the image captured by the camera, a marker positioned on a surface of the vehicle. The marker location determination module can also include instructions to determine a location of the marker on the vehicle based on data encoded the marker. The marker location determination module can also include instructions to determine, based on the location of the marker, a service area for the vehicle located proximate to the marker. The memory can also store a maintenance condition determination module including instructions that, when executed by the one or more processors, cause the one or more processors to retrieve, via the communications system, data generated by the vehicle and associated with the marker, and to determine, based on the retrieved data, a maintenance condition related to the service area of the vehicle located proximate the marker. The memory can also store a robotic control module including instructions that, when executed by the one or more processors, cause the one or more processors to control the robotic arm to perform a service at the service area of the vehicle located proximate to the marker, the service being selected based on the at least one maintenance condition.

Another embodiment includes a method of servicing a vehicle. The method can include detecting, using a camera positioned to capture an image of the vehicle, a marker positioned on a surface of the vehicle. The method can include determining, based on data encoded in the marker, a location of the marker on the vehicle. The method can include determining, based on the location of the marker, a service area located proximate to the marker. The method can include receiving, via a communications system, data generated by the vehicle and associated with the detected marker, the data corresponding to at least one maintenance condition related to the service area of the vehicle located proximate the marker. The method can include controlling one or more components of the service robot to selectively perform one or more services on the vehicle according to, at least, the maintenance condition related to the service area of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems and methods for servicing a vehicle are disclosed herein. As a brief introduction, a service robot can detect a marker positioned on a surface of a vehicle. The marker can include data corresponding to its location on the vehicle. The service robot can determine the location of the marker based on the data. The service robot can also determine the location of a service area proximate to the marker. The service robot can receive data generated by the vehicle corresponding to at least one maintenance condition for the vehicle related to the service area. The service robot can select a service to perform on the vehicle based on the at least one maintenance condition. The service robot can be controlled so as to perform the selected service on the vehicle. The arrangements disclosed herein can potentially expedite the servicing process of vehicles. Further, the arrangements disclosed herein can potentially eliminate the need for a driver to exit a vehicle while the vehicle is being serviced.

Figure 1:
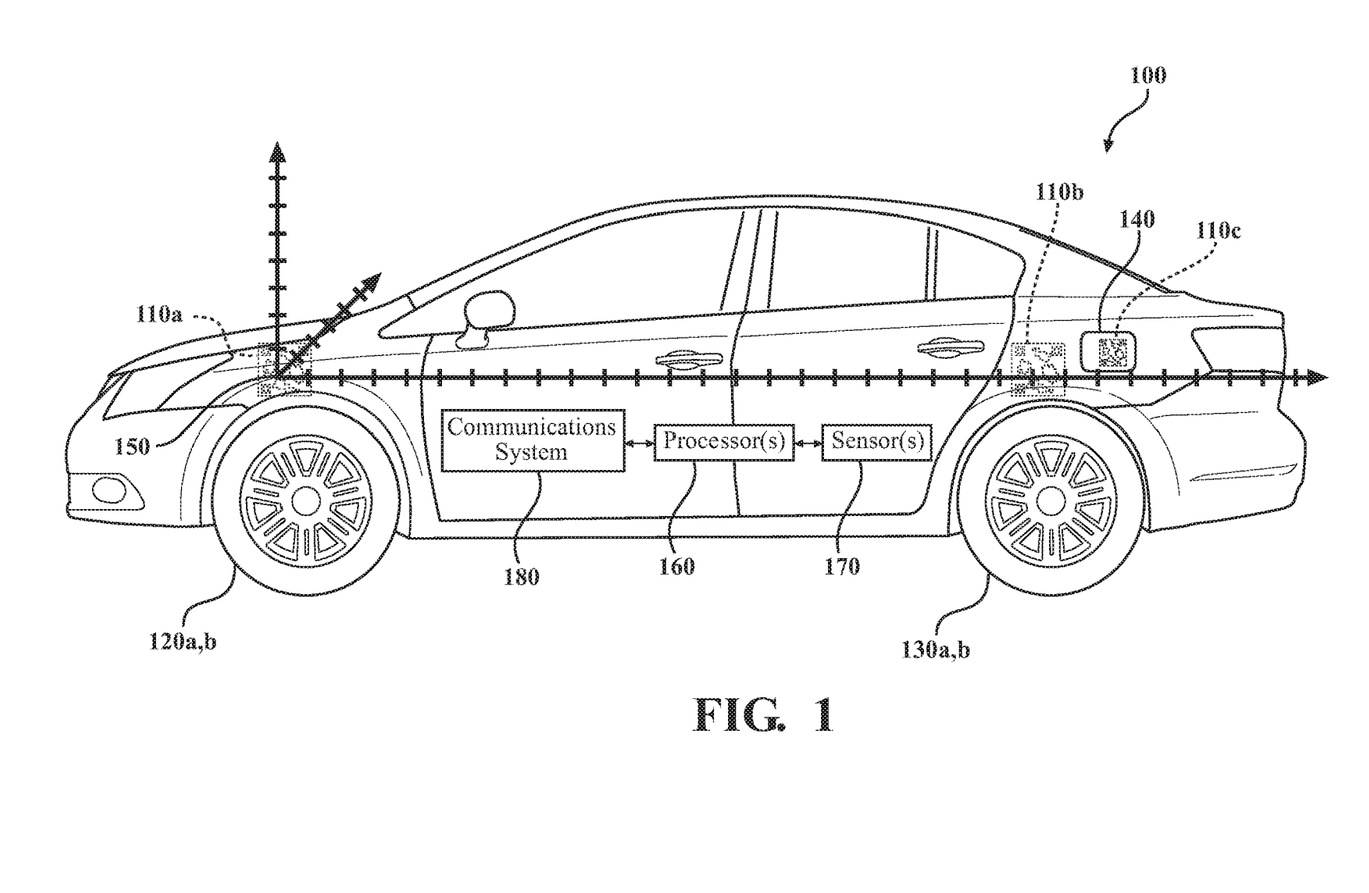
FIG. 1 is a side view of a vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles and can include other forms of motorized transport. The vehicle 100 includes a plurality of markers 110. Although a plurality of markers 110 are shown in FIG. 1, in some examples, the vehicle 100 may only include one marker 110. The markers 110 can be positioned on various surfaces of the vehicle 100. The markers 110 can be glued, adhered, painted, dyed, or otherwise positioned on the various surfaces of the vehicle 100. In one or more arrangements, the markers 110 can be non-visible markers (e.g., reflect outside the visible light spectrum). Visible light spectrum, as used herein, includes a portion of the electromagnetic spectrum that is visibly perceivable by humans. As such, the markers 110 may reflect light outside the visible light spectrum and thereby not visibly perceivable by humans. In one or more arrangements, the markers 110 can be, for example, ultraviolet (UV) or infrared (IR) paints that reflect light in the UV or IR spectrum, respectively.

As shown in FIG. 1, there can be a number of markers 110 positioned on the vehicle 100, each of the markers corresponding to a relative surface of the vehicle 100. For example, the vehicle 100 can include a marker 110a positioned on or above a front tire 120a,b. The vehicle 100 can include a marker 110b positioned on or above a rear wheel 130a,b. The vehicle 100 can include a marker 110c positioned on a fuel door 140. Additionally, the vehicle 100 does not necessarily include all the markers 110 shown in FIG. 1, and therefore the present disclosure should not be limited to these exemplary positions. Furthermore, the vehicle 100 can include additional markers 110 not shown in FIG. 1. In one or more arrangements, the markers 110 can be positioned in close proximity to one another, such that two or more markers 110 may be observable at any given time and at any orientation of the surrounding vehicle 100.

Each of the markers 110 can include data that corresponds to the location of the marker 110 on the surface of the vehicle 100. In one or more arrangements, the markers 110 can include a steganographic pattern. "Steganographic pattern", as used herein, includes any message, data, or the like that is formed as a pattern that is detectable by one or more sensors. In one or more arrangements, the steganographic pattern can be, for example, a QR code, a bar code, etc. In one or more arrangements, the markers 110 can include text that is readable by detecting software, such as optical character recognition software, for example. In one or more arrangements, the steganographic pattern may include redundancies. The redundancies may permit data to be extrapolated from the stenographic pattern, even if the steganographic pattern is damaged (e.g., through scratching, collision, etc.). In one or more arrangements, the steganographic pattern may include encoded authentication information. In these arrangements, the steganographic pattern may be decoded to determine whether the steganographic pattern is an original, authentic pattern.

In the example shown in FIG. 1, marker 110a can include data corresponding to the location of marker 110a on or above the front tire 120a,b. For example, the marker 110a can include data that indicates its relative location on a vehicle grid 138. In one or more arrangements, the center of the vehicle grid 138 can be a point on an exterior surface of the vehicle 100. In another example, the center of the vehicle grid 138 can be the center of mass of the vehicle 100. In one example, the marker 110a can include data indicating that it is the center of the vehicle grid 138, and that all of the remaining markers 110b-110c have local coordinates that in reference to marker 110a. In one example, the local coordinates can be actual physical measurements (e.g., inches, centimeters, etc.) from the marker 110a. In another example, the local coordinates can be unit measurements (e.g., number of units) from the marker 110a. In both of these examples, markers 110b-110c can include data that indicates they are located (X, Y, Z) units from marker 110a. While these examples are disclosed, it should be understood that any of the markers 110 can include data indicating that it is the center of the vehicle grid 138, and the remaining markers 110 can include data indicating their relative position from the center of the vehicle grid 138. Furthermore, there may be multiple centers of the vehicle grid 138, such that a plurality of origins may be detected. In these examples, another vehicle may be able to determine an origin of the vehicle grid 138 even when observing the surrounding vehicle 100 at different angles.

In another example, each of the markers 110 can include data that identifies the surface that it is positioned on or adjacent to (e.g., the driver-side front tire 120a,b for marker 110a, driver's side rear wheel 130a,b for marker 110b, fuel door 140 for marker 110c, etc.). The data can include, for example, machine-readable text or code that states the ordinary name of the surface that each marker 110 is positioned on or adjacent to. Continuing the example of marker 110a, the data can indicate "driver-side front tire". Additionally or alternatively, the data can include a number or tag that corresponds to the driver-side front tire 120a,b. In this example, the vehicle 100 will have a plurality of numbers or tags associated with various surfaces of the vehicle 100, and each marker 110 will include data indicating the number or tag associated with the surface the marker 110 is positioned on.

While the previous examples of various forms of data that can be encoded in markers 110, many other forms of data can be used for the markers 110 that correspond to the surface that each respective marker 110 is positioned on. Additionally, the markers 110 can further include data that identifies the vehicle 100. This identifying data can include, for example, data corresponding to the vehicle 100. The identifying data can be, for example, data corresponding to the vehicle identification number (VIN), the license plate, etc.

The vehicle 100 includes one or more processor(s) 160. The processor(s) 160 are configured to implement or perform various functions described herein. In one or more arrangements, the processor(s) 160 can be a main processor of the vehicle 100. For instance, the processor(s) 160 can be an electronic control unit (ECU). The processor(s) 160 can use instructions to generate and communicate data corresponding to a maintenance condition for the vehicle 100 to a remote location.

The vehicle 100 can include one or more sensor(s) 170. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle 100 includes a plurality of sensors, the sensors can work independently from each other. Alternatively, two or more of the sensors can work in combination with each other. In such case, the two or more sensors can form a sensor network. The sensor(s) 170 can be operatively connected to the processor(s) 160 and/or another element of the vehicle 100. The term "operatively connected," as used throughout this description, can include direct or indirect connections, including connections without direct physical contact.

The sensor(s) 170 can be configured to monitor one or more areas of the vehicle 100. The sensor(s) 170 can be configured to detect at least one maintenance condition for the areas of the vehicle 100 being monitored. The term "maintenance condition," as used throughout this description, includes any condition or state of the vehicle or portions thereof. In one or more arrangements, the sensor(s) 170 can include one or more sensors configured to monitor the fuel tanks, the battery, tires, etc. The sensor(s) 170 can include fuel sensor(s) and/or charge sensor(s) for detecting the energy level in the fuel tanks and/or the battery, respectively. The sensor(s) 170 can detect an energy maintenance condition corresponding to a current energy level (e.g., fuel or battery charge level). The sensor(s) 170 can include tire pressure sensor(s) for detecting a current tire pressure for the tires 120, 130 of the vehicle 100. The sensor(s) 170 can detect a tire pressure maintenance condition corresponding to a current tire pressure level.

The processor(s) 160 can identify any markers 110 located proximate the area of the vehicle 100 corresponding to the sensor data. For example, where the maintenance condition corresponds to a driver-side front tire pressure, the processor(s) 160 can identify marker 110a. Similarly, where the detected maintenance condition corresponds to a fuel level, the processor(s) 160 can identify marker 110c.

The processor(s) 160 can use raw sensor data captured by the sensor(s) 170 for generating maintenance condition data corresponding to markers 110 of the vehicle 100. The generated maintenance condition data can include, for example, identification information for the vehicle 100, the location of the marker 110 associated with the maintenance condition(s), and/or data corresponding to the maintenance condition(s). In one or more arrangements, the data corresponding to the detected maintenance condition(s) can be generally described as metadata for a marker 110. In one or more arrangements, the processor(s) 160 can update the data as changes to the maintenance conditions are detected. In this regard, the maintenance condition data can be live data corresponding to currently detected maintenance condition(s) in the vehicle 100.

The vehicle 100 can include a communication system 180. The communication system 180 can include, for example, an antenna tuned to transmit data over a distance. The vehicle 100 can transmit data to one or more remote locations that are not physically connected to the vehicle 100 using the communication system 180. The communication system 180 can be in communication with another vehicle and/or a remote database. The communication system 180 can communicate via, for example, dedicated short range communications devices. The communication system 180 can communicate via a cellular network, Bluetooth, Wi-Fi, etc.

The processor(s) 160 can communicate the maintenance condition data to the communications system 180. In one or more arrangements, the processor(s) 160 can cause the communications system 180 to communicate the generated maintenance condition data to a remote location. The remote location can be a service robot 200 (of FIG. 2) and/or a maintenance condition database 250 (of FIG. 2). Such a system for communicating data corresponding to a vehicle 100, such as maintenance condition data, to a remote location is described in U.S. patent application Ser. No. 15/422,008 filed herewith, which is incorporated herein by reference in its entirety.

Figure 2:
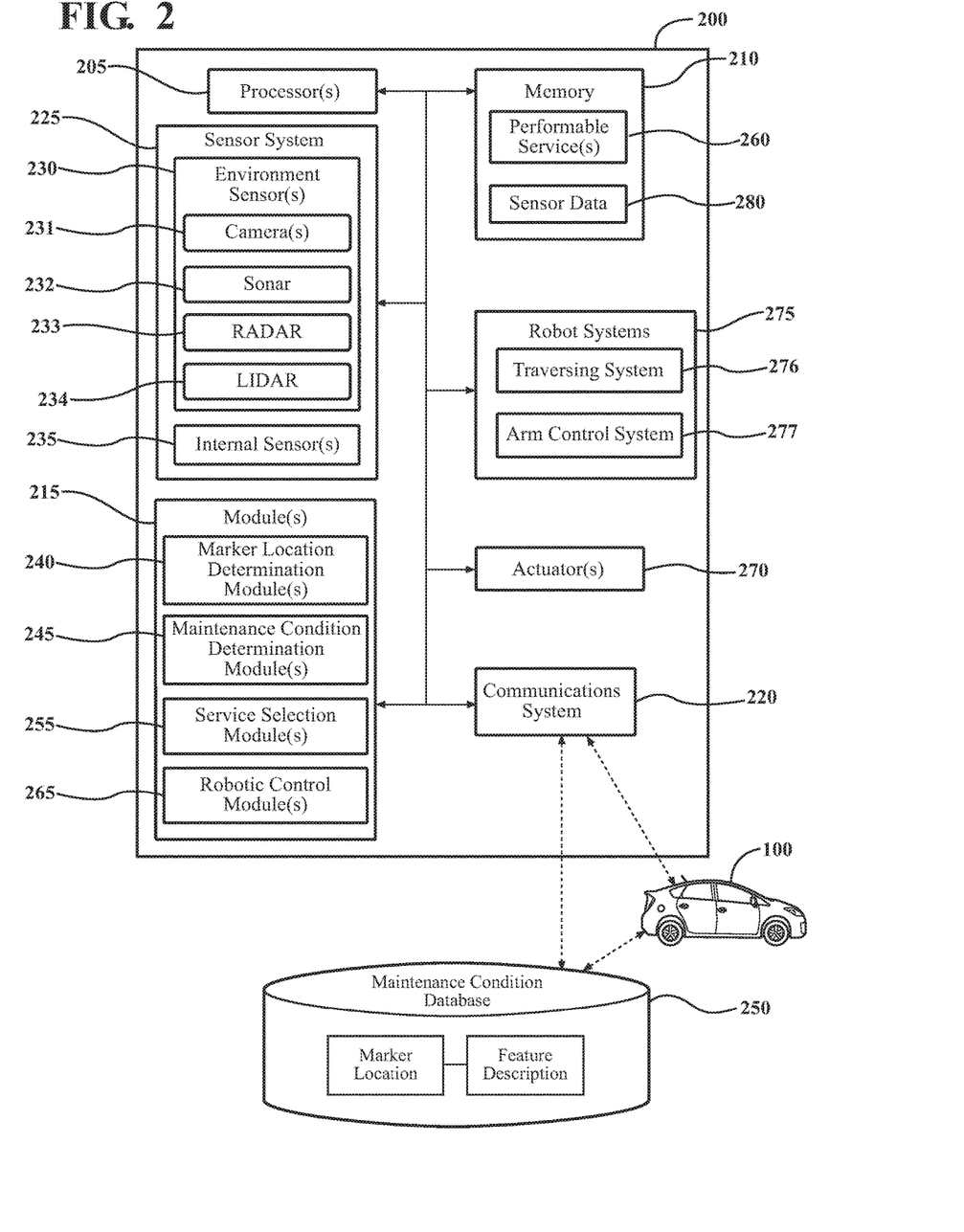
FIG. 2 is a schematic view of a service robot.

Referring now to FIG. 2, a block diagram of a service robot 200 is shown. The service robot 200 can include various elements. It will be understood that, in various embodiments, it may not be necessary for the service robot 200 to have all of the elements shown in FIG. 2. The service robot 200 can have any combination of the various elements shown in FIG. 2. Further, the service robot 200 can have additional elements to those shown in FIG. 2. In some arrangements, the service robot 200 may be implemented without one or more of the elements shown in FIG. 2. Further, while the various elements are shown as being located within the service robot 200 in FIG. 2, it will be understood that one or more of these elements can be located external to the service robot 200. Further, the elements shown may be physically separated by large distances. Additionally, one or more elements of the service robot 200 may be located on a remote server (e.g., cloud-based server) and accessible via secure links.

Some of the possible elements of the service robot 200 are shown in FIG. 2 and will be described along with subsequent figures. However, a description of many of the elements in FIG. 2 will be provided with reference to FIG. 5 after the discussion of FIGS. 3-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The service robot 200 can be configured to perform one or more services on the vehicle 100 of FIG. 1. In one or more arrangements, the service robot 200 can perform one or more services on the vehicle 100 according to the maintenance condition(s) for the vehicle 100.

The service robot 200 includes one or more processor(s) 205. The processor(s) 205 are configured to implement or perform various functions described herein. In one or more arrangements, the processor(s) 205 can be a main processor of the service robot 200. The service robot 200 can include memory 210 for storing one or more types of data. The memory 210 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 210 can be a component of the processor(s) 205, or the memory 210 can be operatively connected to the processor(s) 205 for use thereby.

In one or more arrangements, the memory 210 can include various instructions stored thereon. In one or more arrangements, the memory 210 can store one or more modules 215. Modules can be or include computer-readable instructions that, when executed by the processor(s) 205, cause the processor(s) 205 to perform the various functions disclosed herein. While the modules 215 will be described herein with reference to functions for purposes of brevity, it should be understood that the modules 215 include instructions that cause the processor(s) 205 to perform the described functions. Furthermore, although shown as separate from the memory 210, the modules 215 can be stored in memory 210. It should be noted the various modules can be remotely stored and accessible by the processor(s) 205.

The service robot 200 can include a communication system 220. The communication system 220 generally includes, for example, an antenna tuned to transmit data over a distance. As will be discussed in greater detail below, the communication system 220 can be in communication with another vehicle (such as vehicle 100) and/or a remote database (such as maintenance condition database 250). The communication system 220 can communicate via, for example, dedicated short range communications devices. The communication system 220 can communicate via a cellular network, Bluetooth, Wi-Fi, etc. In one or more arrangements, the communication system 220 can enable the service robot 200 to communicate to a remote database and/or with vehicles, as will be discussed in greater detail below.

The service robot 200 can include a sensor system 225. The sensor system 225 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 225 includes a plurality of sensors, the sensors can work independently from each other. Alternatively, two or more of the sensors can work in combination with each other. In such case, the two or more sensors can form a sensor network. The sensor system 225 and/or the one or more sensors can be operatively connected to the processor(s) 205, the memory 210, and/or another element of the service robot 200 (including any of the elements shown in FIG. 2). As will be understood below, the sensor system 225 can generate data useable by the processor(s) 205 to perform various functions.

The sensor system 225 can include one or more environment sensors 230. The environment sensors 230 can monitor the environment of the service robot 200 that includes the vehicle 100. In one or more arrangements, the environment sensors 230 can detect the vehicle 100, and detect one or more markers 110 on the vehicle 100. The environment sensors 230 can include one or more camera(s) 231. In one or more arrangements, the camera(s) 231 can be high dynamic range (HDR) cameras or infrared (IR) cameras. In one or more arrangements, the camera(s) 231 can be hyperspectral camera(s) capable of detecting light outside the visible light spectrum. In this example, the markers 110 positioned on the vehicle 100 can non-visible markers as previously explained, and the one or more camera(s) 231 can be configured to detect the light outside the visible light spectrum that is reflected from the non-visible markers 110.

Figure 3:
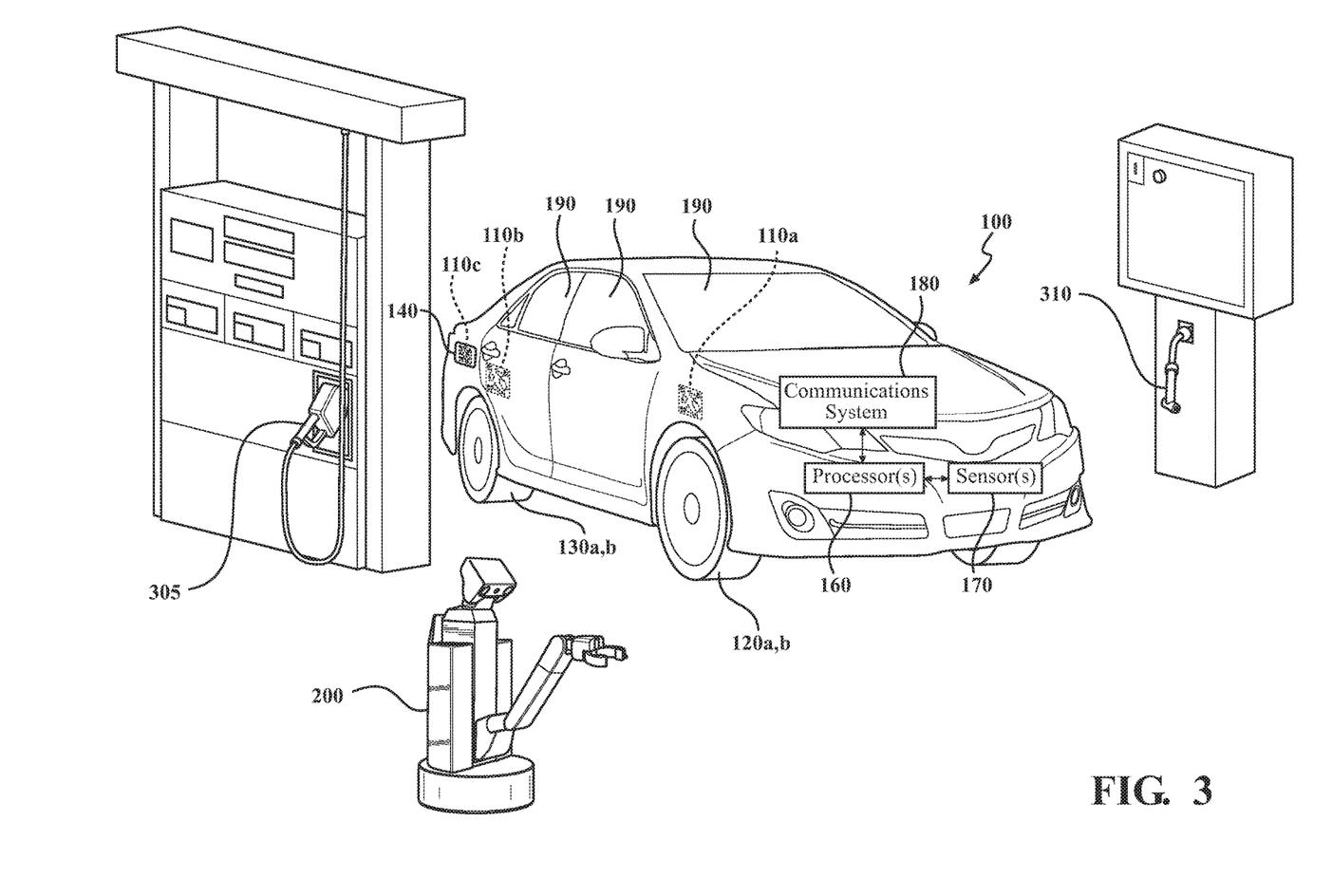
FIG. 3 is a perspective view of a service station including the vehicle of FIG. 1 and the service robot of FIG. 2.

Referring now to FIG. 2 and FIG. 3, the service robot 200 is shown at a robotic service station 300. The service station 300 also includes various service products, such as a fuel pump 305, an air pump 310, etc.

The service robot 200 can include a marker location determination module 240. The marker location determination module 240 can receive data from the sensor system 225 corresponding to the environment of the service robot 200. The vehicle 100 can be located in the environment of the service robot 200. The camera(s) 231 can capture an image of the environment of the service robot 200 including the vehicle 100. The marker location determination module 240 can receive the image from the camera(s) 231. The marker location determination module 240 can process the image. The marker location determination module 240 can detect, via the image captured by the camera(s) 231 and resulting image processing, one or more of the markers 110 positioned on the vehicle 100. The marker location determination module 240 can determine the location of the markers 110 positioned on the vehicle 100. The marker location determination module 240 can decode data encoded in the markers 110 and thereby extract the data for the markers 110. The marker location determination module 240 can determine the location of the markers 110 on the vehicle 100 based on the extracted data for the markers 110.

The marker location determination module 240 can also determine a service area for the vehicle 100 located proximate to the marker(s) 110. In one example, the service area can be an area of the vehicle 100 that a respective marker 110 is positioned on. For example, the service area for marker 110c can be an inlet of the fuel reservoir, which is covered by the fuel door 140. In this example, the marker 110c can be positioned on the fuel door 140. Therefore, upon detecting marker 110c and determining the location of marker 110c based on data encoded in the marker 110c, the marker location determination module 240 can determine that the service area for the marker 110c is the inlet for the fuel reservoir, which is covered both by the fuel door 140 and the marker 110c. In one or more arrangements, the service area can be an area of the vehicle 100 at a predetermined location from a respective marker 110. For example, the service area for markers 110a,b can be the tires 120a,b and 130a,b, respectively, which are positioned below the markers 110a,b. In some examples, a center of the tire may be positioned at a predetermined distance from the center of the marker 110. Upon detecting, for example, marker 110a and determining the location of marker 100a based on data encoded in the marker 110a, the marker location determination module 240 can determine that the service area for the marker 110a is the tire 120a. This information can be used for localization of the service robot 200, targeted servicing of the vehicle 100, and/or other uses. In some examples, determining the service area and localizing the service robot 200 can reduce computing costs, since the service robot 200 may not need to scan the vehicle 100 to determine where to service the vehicle 100, since such information is determined based at least in part on data encoded in the markers 110.

In one or more arrangements, the service robot 200 can include a maintenance condition determination module 245. The maintenance condition determination module 245 can determine one or more maintenance conditions corresponding to a detected marker 110 for the vehicle 100. The one or more maintenance conditions can be a maintenance condition for the service area. In one or more arrangements, the maintenance condition determination module 245 can use the communication system 220 to access the maintenance condition database 250. In this example, the maintenance condition database 250 can include data generated by and transmitted from the vehicle 100. The data generated by the vehicle 100 can include, for example, identification information for the vehicle 100, the location of the marker 110 associated with the maintenance condition(s), and/or data corresponding with the maintenance condition(s). The service robot 200 can access the maintenance condition database 250 and retrieve data generated by the vehicle 100 based on the identification information for the vehicle 100. The data can include data for the one or more maintenance conditions for the vehicle 100. In one or more arrangements, the service robot 200 can receive data for the one or more maintenance conditions directly from the vehicle 100. The service robot 200 can receive data from the vehicle 100 using the communication system 220. In this example, the communication system 220 for the service robot 200 can be configured to exchange data with the communications system 180 of the vehicle 100.

Based on the data received from the maintenance condition database 250 and/or directly from the vehicle 100, the maintenance condition determination module 245 can determine one or more maintenance conditions related to an area of the vehicle 100 located proximate a respective marker 110. For example, the service robot 200 can detect the marker 110c positioned on the fuel door 140 of the vehicle 100. The maintenance condition database 250 can include data indicating a maintenance condition (e.g., current fuel level) corresponding to that marker 110c. The maintenance condition database 250 can also include data indicating which vehicle the maintenance condition is associated with. The service robot 200 can access the maintenance condition database 250 and look up any maintenance conditions associated with the vehicle 100. The service robot 200 can determine that there is data associated with marker 110c for the vehicle 100. The service robot 200 can then determine the maintenance condition (e.g., the current fuel level) associated with the area of the vehicle 100 located proximate the marker 110c (e.g., the fuel tank). As previously discussed, the maintenance condition database 250 can be updated by the vehicle 100 to reflect current maintenance conditions in the vehicle 100.

In one or more arrangements, the service robot 200 can include a service selection module 255. The service selection module 255 can select a service for the service robot 200 to perform on the vehicle 100. In one or more arrangements, the service selection module 255 can select a service to perform on the vehicle 100 according to any maintenance conditions for the vehicle 100.

The memory 210 can store one or more performable services 260. The performable services 260 can be or include sets of directions for performing the service(s) 260. In one or more arrangements, the performable services 260 can include primary services and auxiliary services. As a general matter, the directions can include causing the service robot 200 to locate and retain one or more service products (e.g., fuel pump 305, battery charger, air pump 310, surface cleaner, camera, etc.). The directions can also include causing the service robot 200 locate the service area. As previously described, the service area can, in some examples, be located proximate to a marker 110. In other arrangements, the service area can be an exterior surface of the vehicle 100 (e.g., windows, panels, etc.). The directions can also include causing the service robot 200 to perform the service, using the service product, at the service area on the vehicle 100.

In one or more arrangements, primary services can include services that are performable according to various maintenance conditions for the vehicle 100. Example primary services can include a tire pressure service, an energy service (e.g., refueling or battery charging), etc. Each of the primary services can have their own set of directions. For example, the directions for the tire pressure service can include instructions to remove and retain a tire cap covering an air inlet for a tire by twisting the tire cap in a counterclockwise fashion, locate and retain an air pump 310 at the service station 300, and engage the air pump 310 to the air inlet to thereby pump air into the tire. The directions can further include monitoring the maintenance condition (e.g., the current tire pressure) for the tire while pumping air into the tire. Responsive to the tire pressure being sufficiently filled (e.g., a predetermined fill amount or PSI), the directions can include removing the air pump 310 from the air inlet, and replacing the retained tire cap to the air inlet by twisting the tire cap in a clockwise fashion. As another example, the directions for the energy service can be instructions to open an energy door (e.g., the fuel door 140), remove and retain a cover (e.g., a fuel cap) covering an energy inlet (e.g., a fuel inlet) for the vehicle 100 by twisting the cap in a counterclockwise fashion, locate and retain an energy outlet (e.g., a fuel pump 305) at the service station 300, and engage the energy outlet to the energy inlet and thereby transfer energy (e.g., fuel) to the vehicle 100. Similar to the tire pressure service, the directions for the energy service can also include instructions for monitoring the maintenance condition (e.g., fuel level) for the vehicle 100 while transferring energy to the vehicle 100. Responsive to the energy source of the vehicle 100 (e.g., battery pack or fuel reservoir) being sufficiently filled or charged, the directions can include removing the energy outlet from the energy inlet, and replacing the retained cover to the energy inlet by twisting the cover in a clockwise fashion.

In one or more arrangements, auxiliary services can include services that are generically performed on all vehicles being serviced, regardless of any maintenance conditions for the vehicle 100. For example, the auxiliary services can include a surface cleaning, a vehicle photographing, etc. Similar to the primary services, the auxiliary services can be or include directions for the service robot 200 to perform the various services on the vehicle. The directions for the surface cleaning auxiliary service can include, for example, locating and retaining a surface cleaning container including a surface cleaning fluid at the service station 300, locating a surface on the vehicle 100 to be cleaned, applying the surface cleaning fluid to the surface to be cleaned, and locating, retaining, and applying a rag, sponge, etc. to the surface to thereby clean the surface. The directions for the vehicle photographing can include capturing one or more images of various surfaces of the vehicle 100 and storing the images in a file corresponding to the vehicle 100.

Of course, these directions are dependent on a configuration for the vehicle 100, and therefore instructions should not be limited to these examples. In fact, the directions can take many different forms, and do not necessarily require all the described directions. For example, some vehicles do not include fuel caps, tire caps, etc. Further, some vehicles do not have fuel reservoirs, and instead are battery operated. In these examples, the service robot 200 can engage a battery charger to a battery inlet of the vehicle 100. Additionally, the service robot 200 can be modified to include one or more of the various service products (e.g., various pumps, nozzles, etc.). In this example, the directions can be modified to reflect these various changes in the configuration of the vehicle 100 and/or service robot 200. Further, specific vehicles may have specific directions for performing different services. The service robot 200 can identify the type of vehicle (e.g., make/model/year), and access a look-up table (stored on memory 210, a remote database, etc.) for identifying specific directions for the various services. In one or more arrangements, the vehicle 100 may include the directions for performing the various services. In this example, the vehicle 100 can communicate the directions to the service robot 200. As will be discussed in greater detail below, the service robot 200 can use the directions to perform the various services on the vehicle 100.

The service selection module 255 can select one or more services to perform on the vehicle 100. In one or more arrangements, the service selection module 255 can select the service(s) to perform on the vehicle 100 based on the detected maintenance conditions determined by the maintenance condition determination module 245. For example, the service selection module 255 can compare the maintenance conditions for the vehicle 100 to threshold maintenance conditions. In one or more arrangements, each maintenance condition may have a corresponding threshold condition. Threshold conditions can be vehicle-specific, can be encoded in markers 110 on the vehicle 100, and/or can be generic. Where the threshold conditions are vehicle specific, the service selection module 255 can access a look-up table and determine the threshold conditions for the vehicle 100 according to identifying information in the markers 110. Additionally or alternatively, the threshold conditions can be encoded into the markers 110, and the service selection module 255 can determine the threshold conditions based on the encoded data. Additionally or alternatively, the threshold conditions can be generic, as in they are suitable for most vehicles. Additionally or alternatively, an owner/operator can set the threshold conditions for the vehicle 100. Further, the set thresholds can be limited to particular times of day, location, etc. In one or more arrangements, the service selection module 255 can receive the threshold conditions from the vehicle 100 via the communications system 220.

For purposes of an example, the threshold condition corresponding to the maintenance condition for the current fuel level may be, for example, 50% of fuel remaining. The service selection module 255 may compare the current maintenance condition (e.g., current fuel level) to the corresponding threshold condition (e.g., 50% of fuel remaining). The service selection module 255 can select a service to perform (e.g., an energy service) based on the comparison (e.g., the current fuel level being less than the threshold).

While the threshold is described as a percentage, the threshold can take other various forms, such as a volumetric measurement, a number miles until empty, etc. Accordingly, the present disclosure should not be limited to a percentage threshold, and should include other threshold variations of measurements that could be used to determine whether a particular service is necessary or desirable. Furthermore, where the threshold is a percentage, it should be understood that the present disclosure is not limited to 50%, and should include variations (e.g., +/−5%, 10%, 15%, 20%, etc.).

As another example, the threshold condition corresponding to the maintenance condition for the current tire pressure may be a threshold pounds-per-square inch (PSI). The threshold PSI may be specific to a type of vehicle similar to the PSI printed on many door jams, or the threshold PSI may be generic (e.g., a PSI that is suitable for most tires on vehicles). The service selection module 255 can compare the current maintenance condition (e.g., the current tire pressure for one of tires of the vehicle 100) to the threshold condition (e.g., threshold PSI). The service selection module 255 can select a service to perform (e.g., a tire pressure service) based on the comparison (e.g., the current tire pressure being less than the threshold PSI).

The service selection module 255 can select primary and/or auxiliary services to perform on the vehicle 100. The service selection module 255 can, in some examples, select primary services to perform on the vehicle 100 according to the maintenance conditions for the vehicle 100, and can select auxiliary services to perform on the vehicle 100 indiscriminately. Further, in some arrangements, the maintenance conditions for the vehicle 100 may indicate that a primary service for the vehicle 100 may not be necessary/desirable. In arrangements such as these, the service selection module 255 may select only auxiliary service(s) to perform on the vehicle 100.

The service robot 200 can include a robotic control module 265. As will be discussed in greater detail below, the service robot 200 can generate one or more control signals according to the instructions for the particular selected service(s) to control the service robot 200 to perform those particular service(s). As a brief example, the robotic control module 265 can generate one or more control signals to move the service robot 200 and/or components thereof. The service robot 200 can locate, remove, and retain various components of the vehicle 100, such as tire or fuel caps. The service robot 200 can locate and retain various service products (such as fuel pump 305, air pump 310, surface cleaning supplies, etc.). The service robot 200 can use the retained service products to perform corresponding services on the vehicle 100.

It should be understood that the previous description of instructions are merely examples. In some arrangements, the service robot 200 can be modified to include various nozzles and outlets. The nozzles and outlets included in the service robot 200 can be similar to various fuel pumps, air pumps, fluid application nozzles, etc. In examples such as this, rather than locating and retaining the fuel pump 305, air pump 310, surface cleaning supplies, etc., the service robot 200 may already include these components and, therefore, instructions related to locating these components can be ignored. Further, although described as a single robot, such a system may include multiple service robots performing all the necessary/desirable services on the vehicle. As such, the present disclosure should not be limited to a single service robot.

Figure 4:
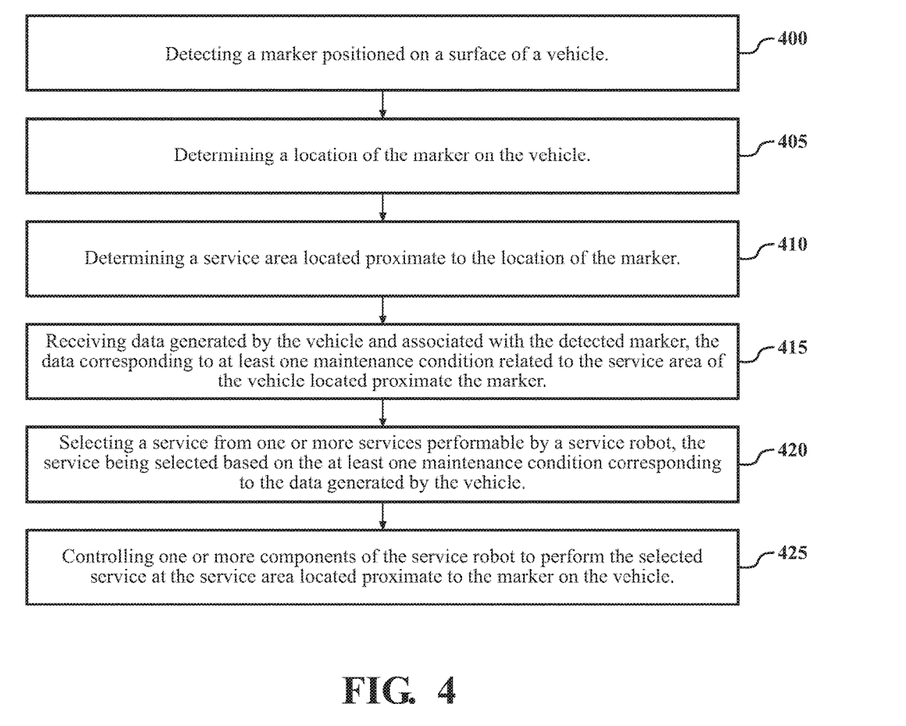
FIG. 4 is a flowchart showing an example method of servicing a vehicle.

Now that various aspects of the service robot 200 have been described, a method of servicing a vehicle will be described with reference to FIG. 4. The flowchart shown in FIG. 4 is only for purposes of providing an example method. The following disclosure should not be limited to each and every function block shown in FIG. 4. To the contrary, the method does not require each and every function block shown. In some examples, the method may include additional function blocks. Further, the method does not need to be performed in the same chronological order shown in FIG. 4.

As shown in the example flow chart depicted in FIG. 4, the method can begin at function block 400.

At function block 400, the service robot 200 can detect a marker 110 positioned on a surface of a vehicle 100. The service robot 200 can detect the marker 110 using, for example, data from one or more sensors, such as a camera 231. In some examples, the marker 110 may be a non-visible marker. In examples such as this, the camera 231 may be a hyperspectral camera configured to detect light outside the visible spectrum. The marker 110 may be a marker 110a,b positioned above tires 120a,b or 130a,b, respectively. The marker 110 may be a marker 110c positioned on a fuel door 140. The camera(s) 231 can capture an image of the external environment of the service robot 200 including the vehicle 100. The marker location determination module 240 can receive the image from the camera(s) 231. The marker location determination module 240 can process the image. The marker location determination module 240 can detect, via the image captured by the camera(s) 231 and resulting image processing, one or more of the markers 110 positioned on the vehicle 100. The method can continue to function block 405.

At function block 405, the service robot 200 can determine a location of the marker 110 on the vehicle 100. In one or more arrangements, the marker location determination module 240 can determine the location of the markers 110 positioned on the vehicle 100 based on the image captured by the camera(s) 231. In some examples, each of the markers 110 can include data, for example, encoded into a steganographic pattern. The marker location determination module 240 can decode data encoded in the markers 110 and thereby extract the data for the markers 110. The marker location determination module 240 can determine the location of the markers 110 on the vehicle 100 based on the extracted data for the markers 110. The method can continue to function block 410.

At function block 410, the service robot 200 can determine a service area located proximate to the location of the marker(s) 110. In one or more arrangements, the marker location determination module 240 can determine a service area for the vehicle 100 located proximate to the marker(s) 110 based on data encoded in the marker(s) 110. In one example, the service area can be an area of the vehicle 100 that a respective marker 110 is positioned on. In another example, the service area can be an area of the vehicle 100 at a predetermined location from a respective marker 110. Upon detecting a marker 110, determining the location of the marker 110 based on data encoded in the marker 110, the marker location determination module 240 can determine the service area for the marker 110. The method can continue to function block 415.

At function block 415, the service robot 200 can receive data generated by the vehicle 100. The data received by the service robot 200 and generated by the vehicle 100 can be associated with the detected marker 110. The data can correspond to at least one maintenance condition related to the service area of the vehicle located proximate the marker 110. The data can be transmitted directly from the vehicle 100 to the service robot 200 using communications systems 180 and 220, respectively. In another example, the data can be transmitted from the vehicle 100 to the maintenance condition database 250. In this example, the service robot 200 can access the maintenance condition database 250 to retrieve data stored thereon. The data stored on the maintenance condition database 250 can include data corresponding to the marker 110. In some examples, the data can indicate the location of or otherwise identify the marker 110, along with associated data for the marker 110. The associated data can include maintenance condition data related to the service area of the vehicle located proximate to the marker 110. The method can continue to function block 420.

At function block 420, the service robot 200 can select a service from one or more services performable by the service robot 200. In some arrangements, the service robot 200 may store one or more performable service(s) 260 on memory. Each of the performable service(s) 260 can include instructions for performing various service(s) on the vehicle 100. Some instructions may be vehicle-specific. Some instructions may be universally applicable to all vehicles.

In some examples, the service being selected can be based on the at least one maintenance condition corresponding to the data generated by the vehicle 100. In these examples, the service being selected can be a primary service, as described above. In another example, the service being selected can be a service that is performed indiscriminately on all vehicles. In these examples, the service being selected can be an auxiliary service, as described above. The service selection module 255 can select one or more services to perform on the vehicle 100 based on the maintenance conditions detected. In some arrangements, the service selection module 255 may always select one or more auxiliary services to perform on the vehicle 100, and selectively perform primary services based on whether the maintenance condition determined at function block 415 indicates that one or more primary service(s) are necessary and/or desirable. The method can continue to function block 425.

At function block 425, the service robot 200 can perform the selected service on the vehicle 100. The robotic control module 265 can control one or more components of the service robot 200 to perform the selected service at the service area located proximate to the marker 110. In one or more arrangements, the robotic control module 265 can control one or more components of the service robot 200 according to instructions from the performable service(s) 260 stored on memory. In some arrangements, the robotic control module 265 can generate control signals to cause the service robot 200 to locate, remove, and retain various components of the vehicle 100, such as tire or fuel caps. The robotic control module 265 can generate control signals to cause the service robot 200 to locate and retain various service products (such as fuel pump 305, air pump 310, surface cleaning supplies, etc.). The service robot 200 can use the retained service products to perform corresponding services on the vehicle 100.

Figure 5A:
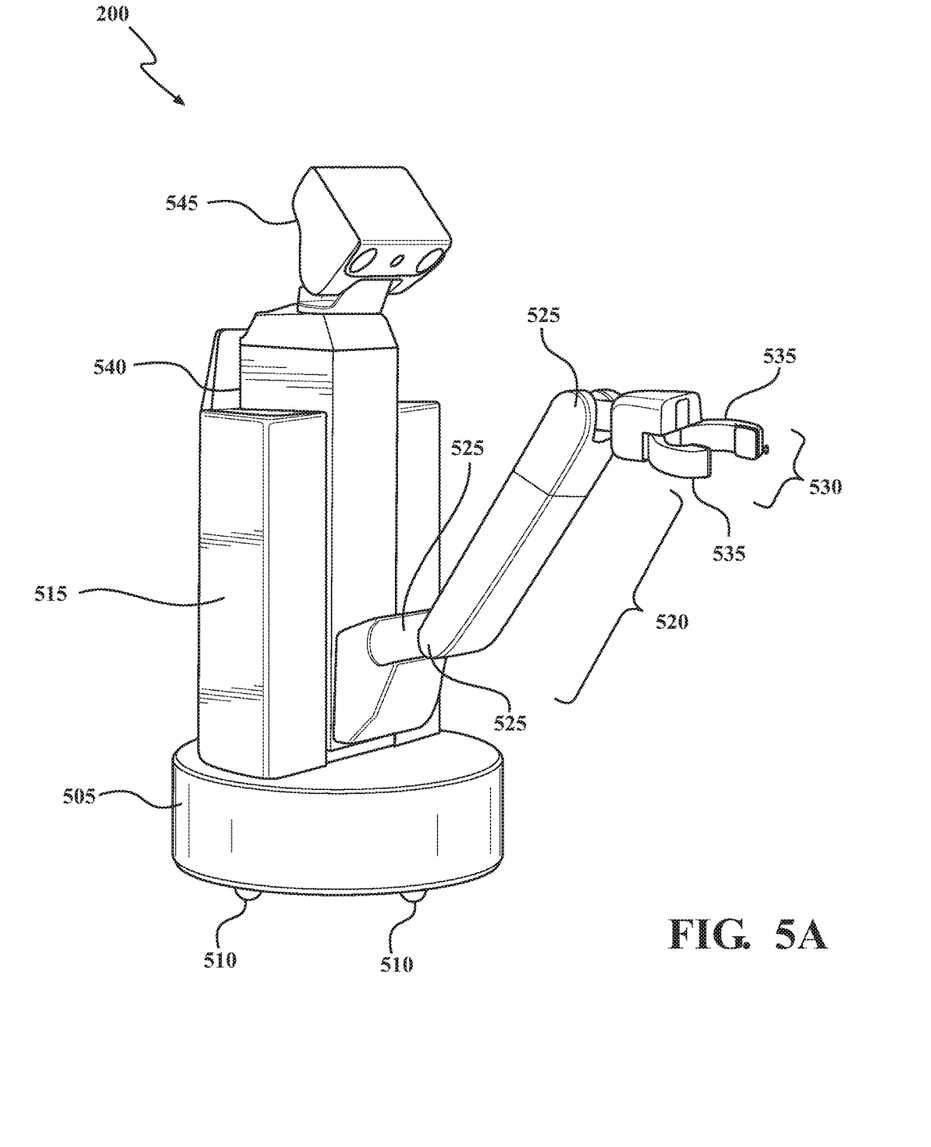
FIG. 5A-FIG. 5C are perspective views of various configurations of the service robot of FIG. 2.
Figure 5B:
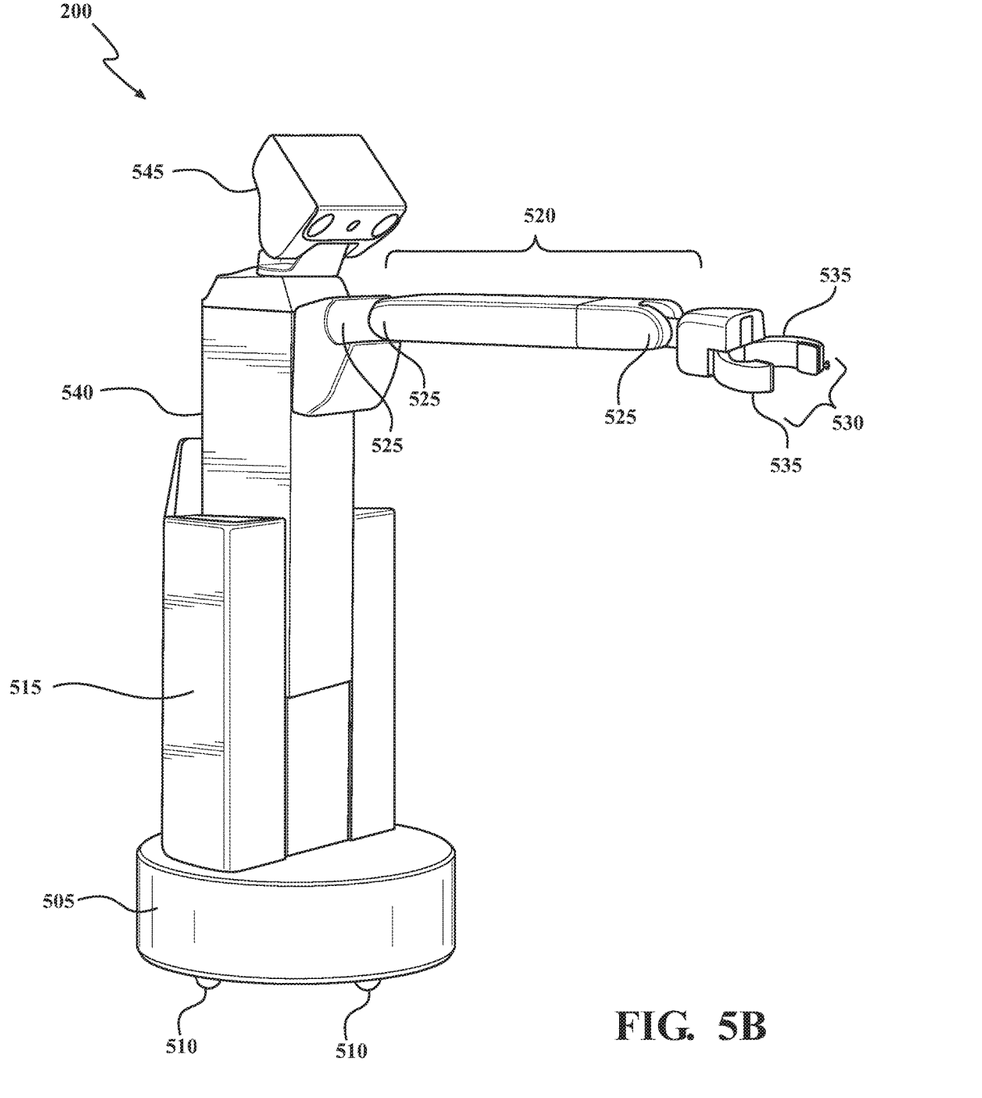
Figure 5C:
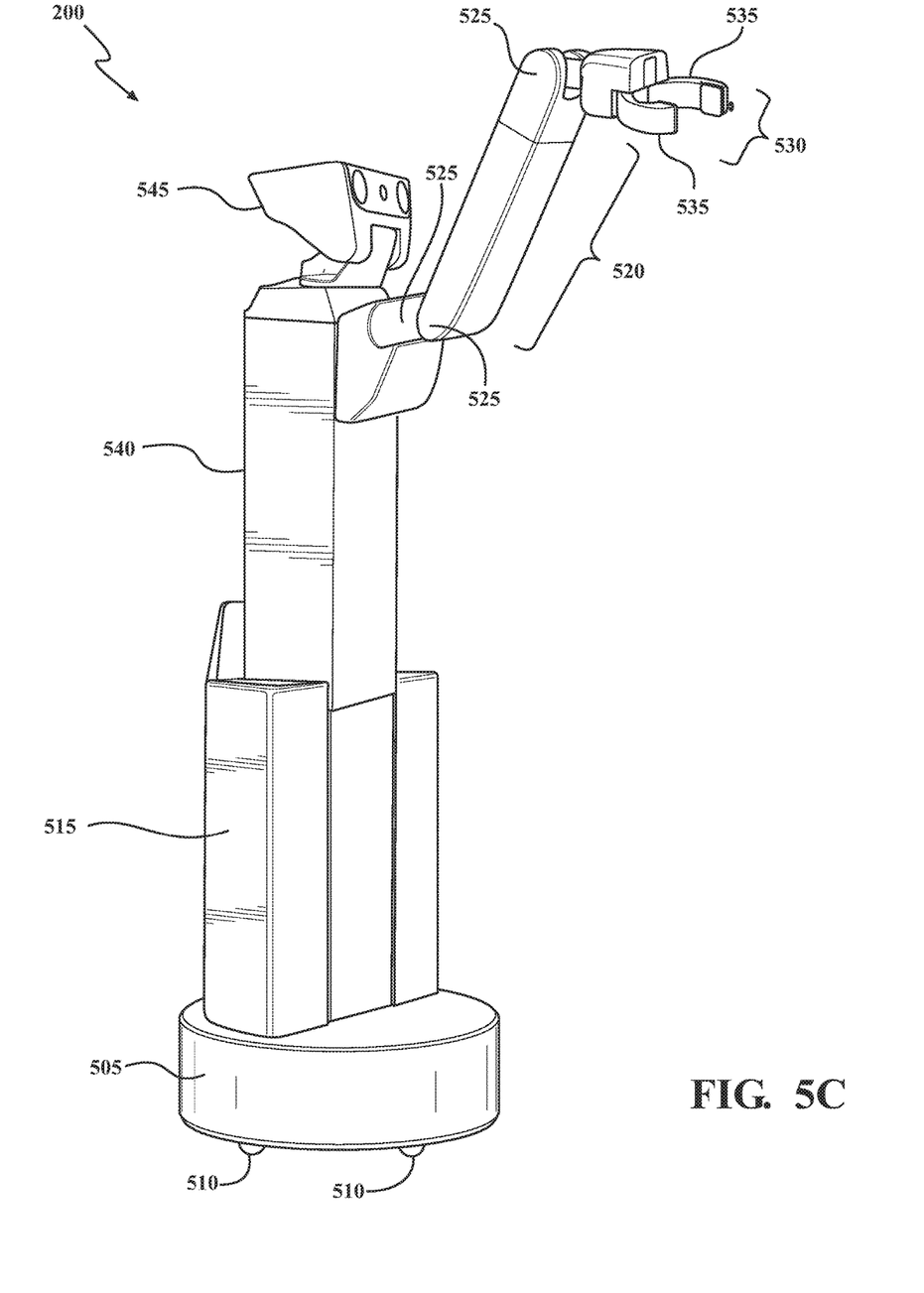

Referring now to FIG. 2 and FIG. 5, an example of the service robot 200 is shown. Various features for the service robot 200 will now be discussed in full detail as an example environment within which the system and methods disclosed herein may operate. In one or more embodiments, the service robot 200 may be automated. As used herein, "automated" refers to a robot that is navigated, controlled and/or maneuvered using one or more computing systems to control the service robot 200 with minimal or no input from a human operator.

An example of a service robot 200 including several of the various components described herein is the Toyota Human Support Robot (HSR). The service robot 200 shown in FIG. 5 can include some of the components shown in FIG. 2.

The service robot 200 can include a base 505. The base 505 can support the service robot 200 in an upright orientation. The base 505 can include a plurality of wheels 510. The wheels 510 can be any types of wheels, such as castor wheels, omniwheels, center oriented wheels, etc. The wheels 510 can enable the service robot to traverse a landscape or environment (e.g., by strafing, surging, yawing, etc.). The wheels 510 can be powered by various motors, actuators, etc.

The service robot 200 can include a body 515. The body 515 can include various components of the service robot 200, including at least some of those shown in FIG. 2. The body 515 can in some examples include a power source, such as a battery pack. The body 515 can be mechanically coupled to and supported by the base 505.

The service robot 200 can include at least one arm 520. The arm 520 can be rotatably coupled to the body 515 of the service robot 200. The arm 520 can include various actuatable joints 525. The actuatable joints 525 can enable rotational movement of various intermediate portions of the arm 520. The actuatable joints 525 can enable the arm 520 to have upwards of six degrees of freedom of motion. The arm 520 can also include a hand 530, which is coupled to the arm 520 via one of the actuatable joints 525. The hand 530 can include at least one pair of opposing fingers 535 that are rotatably coupled to the hand 530. The fingers 535 can support gripping, twisting, etc. actions by the hand 530.

The service robot 200 can include an extendable portion 540. The extendable portion 540 can be housed in the body 515. The arm 520 can be rotatably coupled to the extendable portion 540. The extendable portion 540 can enable the service robot 200 to elevate the arm 520 to different heights as shown in the various configurations of the service robot 200 in FIG. 5.

The service robot 200 can include a head 545. The head 545 can be rotatably coupled to the body 515 such that the head 545 can yaw or pitch. The head 545 can, in some examples, house various sensors from the sensor system 225. For example, the head 545 can house the camera(s) 231, and/or other environment sensors 230.

The service robot 200 can include one or more actuators 270. The actuators 270 can be any element or combination of elements operable to modify, adjust and/or alter one or more of the robot systems 275 or components thereof responsive to receiving signals or other inputs from the processor(s) 205 and/or the robotic control module(s) 265. Any suitable actuator can be used. For instance, the one or more actuators 270 can include motors, pneumatic actuators, hydraulic pistons, relays, solenoids, and/or piezoelectric actuators, just to name a few possibilities.

The memory 210 can include sensor data 280. In this context, "sensor data" means any information about the sensors that the service robot 200 is equipped with, including the capabilities and other information about such sensors. As will be explained below, the service robot 200 can include the sensor system 225. The sensor data 280 can relate to one or more sensors of the sensor system 225. As an example, in one or more arrangements, the sensor data 280 can include information on one or more camera(s) 231 of the sensor system 225.

In some instances, at least a portion of the sensor data 280 can be located in memory 210 located onboard the service robot 200. Alternatively, or in addition, at least a portion of the sensor data 280 can be located in memory 210 that is located remotely from the service robot 200.

As noted above, the service robot 200 can include the sensor system 225. The sensor system 225 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 225 includes a plurality of sensors, the sensors can work independently from each other. Alternatively, two or more of the sensors can work in combination with each other. In such case, the two or more sensors can form a sensor network. The sensor system 225 and/or the one or more sensors can be operatively connected to the processor(s) 205, the memory 210, and/or another element of the service robot 200 (including any of the elements shown in FIG. 2). The sensor system 225 can acquire data of at least a portion of the environment of the service robot 200 (e.g., the present context).

The sensor system 225 can include any suitable type of sensor. Various examples of different types of sensors will be described herein. However, it will be understood that the embodiments are not limited to the particular sensors described. The sensor system 225 can include one or more internal sensor(s) 235. The internal sensor(s) 235 can detect, determine, and/or sense information about the service robot 200 itself. In one or more arrangements, the internal sensor(s) 235 can be configured to detect, and/or sense position and orientation changes of the service robot 200, such as, for example, based on rotation or movement of various actuatable joints 525 or motors of the service robot 200. In one or more arrangements, the internal sensor(s) 235 can include one or more accelerometers, one or more gyroscopes, an inertial measurement unit (IMU), and/or other suitable sensors. The internal sensor(s) 235 can also include potentiometers, torque sensors, etc.

Alternatively, or in addition, the sensor system 225 can include one or more environment sensors 230 configured to acquire, and/or sense environment data. "Environment data" includes and data or information about the environment in which an object, such as the service robot 200, is located or one or more portions thereof. For example, the one or more environment sensors 230 can be configured to detect, quantify and/or sense objects, such as the vehicle 100, in at least a portion of the environment of the service robot 200 and/or information/data about such objects.

Various examples of sensors of the sensor system 225 will be described herein. The example sensors may be part of the environment sensor(s) 230 and/or the internal sensor(s) 235. However, it will be understood that the embodiments are not limited to the particular sensors described.

As an example, in one or more arrangements, the sensor system 225 can include one or more camera(s) 231, one or more sonar sensors 232, one or more radar sensors 233, and/or one or more LIDAR sensors 234. In one or more arrangements, the one or more camera(s) 231 can be high dynamic range (HDR) cameras or infrared (IR) cameras. In one or more arrangements, the one or more camera(s) 231 can be hyperspectral cameras.

The service robot 200 can include one or more robot systems 275. Various examples of the one or more robot systems 275 are shown in FIG. 2. However, the service robot 200 can include more, fewer, or different robot systems. It should be appreciated that although particular robot systems are separately defined, each or any of the systems or portions thereof may be otherwise combined or segregated via hardware and/or software within the service robot 200. The service robot 200 can include a traversing system 276, and/or an arm control system 277. The traversing system 276 can include one or more components and/or devices for moving the service robot 200 from location to location. The arm control system 277 can include one or more components and/or devices for moving the arm 520 of the service robot 200. The arm control system 277 can include, for example, the extendible portion 540, the actuatable joints 525, the hand 530 and fingers 535, and actuators (e.g., actuators 270) associated therewith. Each of these systems can include one or more devices, components, and/or combination thereof, now known or later developed.

The service robot 200 can include a robotic control module(s) 265. The robotic control module(s) 265 can be configured to communicate with the various robot systems 275. In one or more arrangements, the processor(s) 205 and/or robotic control module(s) 265 can be operatively connected to communicate with the various robot systems 275 and/or individual components thereof. For example, returning to FIG. 2, the processor(s) 205 and/or the robotic control module(s) 265 can be in communication to send and/or receive information from the various robot systems 275 to control the movement, speed, maneuvering, heading, direction, etc. of the service robot 200. The processor(s) 205 and/or the robotic control module(s) 265 may control some or all of these robot systems 275 and, thus, the service robot 200 may be partially or fully automated.

The processor(s) 205 and/or the robotic control module(s) 265 may be operable to control the traversing and/or maneuvering of the service robot 200 by controlling one or more of the robot systems 275 and/or components thereof. For instance, the processor(s) 205 and/or the robotic control module(s) 265 can control the movement of the service robot 200. The processor(s) 205 and/or the robotic control module(s) 265 can cause the service robot 200 to accelerate (e.g., by activating an actuator 270 to cause one or more of the wheels 510 to rotate), decelerate (e.g., by deactivating the actuator 270 causing the one or more wheels 510 to stop rotating and/or by applying brakes) and/or change direction (e.g., by actuating various actuators 270 to cause various sets of wheels 510 to rotate and/or turning various wheels 510). As used herein, "cause" or "causing" means to make, force, compel, direct, command, instruct, and/or enable an event or action to occur or at least be in a state where such event or action may occur, either in a direct or indirect manner. In one or more arrangements, the robotic control module(s) 265 can evaluate data from one or more of the internal sensor(s) 235 as feedback for determining variations in movement. The feedback can be used to update and/or revise control signals used to control the one or more robot systems 275 and/or components thereof.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5C, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A robotic service station system for servicing a vehicle, comprising:
    a service robot for performing one or more services on the vehicle;
    one or more processors communicably coupled to a camera and to the service robot;
    a memory communicably coupled to the one or more processors and storing:
    a marker location determination module including instructions that, when executed by the one or more processors, cause the one or more processors to detect, using an image captured by the camera, a marker positioned on a surface of the vehicle, to determine a location of the marker on the vehicle based on data encoded the marker, and to determine, based on the location of the marker, a service area located proximate to the marker;
    a maintenance condition determination module including instructions that, when executed by the one or more processors, cause the one or more processors to determine, based on data generated by the vehicle and associated with the detected marker, a maintenance condition related to the service area of the vehicle located proximate the marker; and
    a robotic control module including instructions that, when executed by the one or more processors, cause the one or more processors to control one or more components of the service robot to perform a service at the service area, the service selected from the one or more services performable by the service robot based on the maintenance condition.

2. The system of claim 1, wherein the marker is a non-visible marker, and wherein the camera is a hyperspectral camera configured to detect the non-visible marker on the vehicle.

3. The system of claim 1, wherein the camera is positioned on the service robot.

4. The system of claim 1, wherein the maintenance condition determined by the maintenance condition determination module corresponds to an energy level for the vehicle, and wherein the service selected by the service selection module includes an energy service on the vehicle.

5. The system of claim 1, wherein the at least one maintenance condition determined by the maintenance condition determination module corresponds to a tire pressure for a tire of the vehicle, and wherein the service selected by the service selection module includes a tire pressure service for the tire.

6. The system of claim 1, wherein the service selection module further includes instructions to select an auxiliary service to perform on the vehicle, the auxiliary service including at least one of a vehicle photographing and a surface cleaning.

7. A service robot, comprising:
    a camera positioned to capture an image of a vehicle located proximate to the service robot;
    a robotic arm that is actuatable to perform one or more services on the vehicle;
    one or more processors communicably coupled to the camera and the robotic arm; and
    a memory communicably coupled to the one or more processors and storing:
    directions for each of the one or more services performable by the service robot;
    a marker location determination module including instructions that, when executed by the one or more processors, cause the one or more processors to detect, using the image captured by the camera, a marker positioned on a surface of the vehicle, to determine a location of the marker on the vehicle based on data encoded the marker, and to determine, based on the location of the marker, a service area for the vehicle located proximate to the marker;
    a maintenance condition determination module including instructions that, when executed by the one or more processors, cause the one or more processors to retrieve, via the communications system, data generated by the vehicle and associated with the marker, and to determine, based on the retrieved data, a maintenance condition related to the service area of the vehicle located proximate the marker; and
    a robotic control module including instructions that, when executed by the one or more processors, cause the one or more processors to control the robotic arm to perform a service at the service area of the vehicle located proximate to the marker, the service being selected based on the at least one maintenance condition.

8. The service robot of claim 7, further comprising:
    a service selection module including instructions that, when executed by the one or more processors, cause the one or more processors to select the service from the one or more services performable by the service robot, the service being performed using the robotic arm and instructions included on the robotic control module.

9. The service robot of claim 8, wherein the instructions to perform the selected service comprises:
    locate a service product;
    retain the service product; and
    perform, using the service product, the selected service on the vehicle at the service area.

10. The service robot of claim 7, wherein the one or more services include primary services to be selectively performed on the vehicle according to at least one maintenance condition, and auxiliary services.

11. The service robot of claim 10, wherein the robotic control module further includes instructions that cause the one or more processors to control the robotic arm to perform the selected service at the service area by controlling the robotic arm to perform the selected service according to the instructions to performed the selected service stored on memory.

12. The service robot of claim 7, wherein the camera is a hyperspectral camera.

13. A method of servicing a vehicle comprising:
    detecting, using a camera positioned to capture an image of the vehicle, a marker positioned on a surface of the vehicle;
    determining, based on data encoded in the marker, a location of the marker on the vehicle;
    determining, based on the location of the marker, a service area located proximate to the marker;
    receiving, via a communications system, data generated by the vehicle and associated with the detected marker, the data corresponding to a maintenance condition related to the service area of the vehicle located proximate the marker; and
    controlling one or more components of a service robot to selectively perform one or more services on the vehicle according to, at least, the maintenance condition related to the service area of the vehicle.

14. The method of claim 13, wherein the maintenance condition comprises a current energy level, and wherein the service robot selectively performs an energy service on the vehicle.

15. The method of claim 14, wherein controlling the one or more components of the service robot to selectively perform the energy service comprises:
    controlling the one or more components of the service robot to engage a service product to an energy inlet of the vehicle, the service product including at least one of a fuel pump and a battery charger; and
    controlling the one or more components of the service robot to transfer energy from the service product to the energy inlet of the vehicle.

16. The method of claim 13, wherein the maintenance condition comprises a tire pressure for a tire of the vehicle, and wherein the service robot selectively performs a tire pressure service on the vehicle.

17. The method of claim 16, wherein controlling the one or more components of the service robot to selectively perform the tire pressure service comprises:
    controlling the one or more components of the service robot to engage a service product to an air inlet of the tire, the service product including air pump; and
    controlling the one or more components of the service robot to transfer air from the service product to the air inlet of the tire.

18. The method of claim 13, wherein controlling one or more components of the service robot to selectively perform the one or more services on the vehicle according to, at least, the maintenance condition related to the service area of the vehicle comprises controlling one or more components of the service robot to selectively perform one or more primary services and one or more auxiliary services on the vehicle according to, at least, the maintenance condition related to the service area of the vehicle.

19. The method of claim 18, wherein the auxiliary service includes at least one of a surface cleaning and a vehicle photographing.

20. The method of claim 13, wherein the camera is a hyperspectral camera, and wherein detecting, using the camera positioned to capture the image of the vehicle, the marker positioned on the surface of the vehicle comprises detecting, using the hyperspectral camera positioned to capture the image of the vehicle, a non-visible marker positioned on the surface of the vehicle.

* * * * *

UNITED STATES PATENT AND TRADEMARK OFFICE
CERTIFICATE OF CORRECTION

PATENT NO. : 10,207,411 B2
APPLICATION NO. : 15/422016
DATED : February 19, 2019
INVENTOR(S) : Nikolais Michalakis Page 1 of 1

It is certified that error appears in the above-identified patent and that said Letters Patent is hereby corrected as shown below:

In the Specification

Column 1, Line 40: replace "data encoded the marker" with --data encoded in the marker--

Column 2, Line 8: replace "data encoded the marker" with --data encoded in the marker--

Column 19, Lines 36-37: replace "data encoded the marker" with --data encoded in the marker--

Column 20, Lines 26-27: replace "data encoded the marker" with --data encoded in the marker--

Column 4, Line 19: replace "that in reference" with --that are in reference--

Column 4, Lines 53-54: replace "While the previous examples of various" with --While the previous examples are of various--

Signed and Sealed this
Twenty-sixth Day of November, 2019

Andrei Iancu
*Director of the United States Patent and Trademark Office*